T. J. FEGLEY.
CHUCK.
APPLICATION FILED JAN. 9, 1908.
917,033.
Patented Apr. 6, 1909.
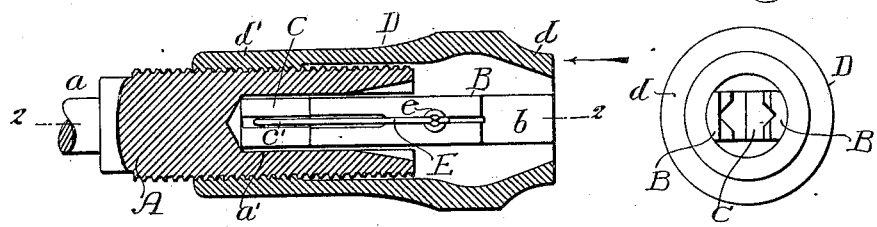
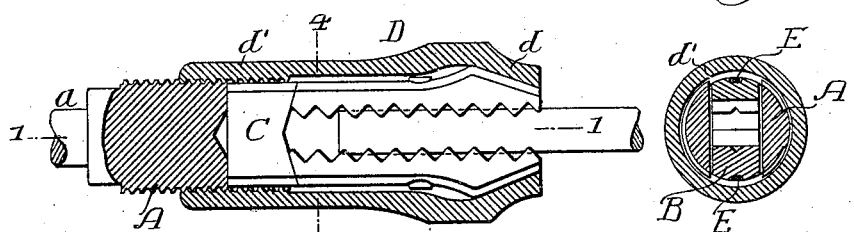
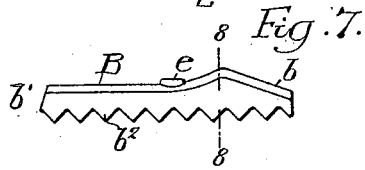
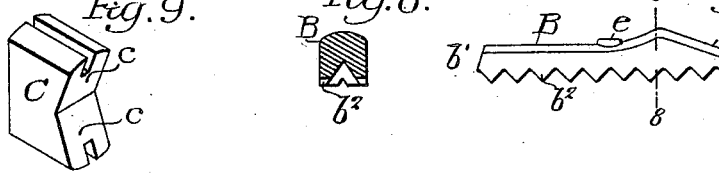
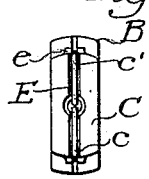
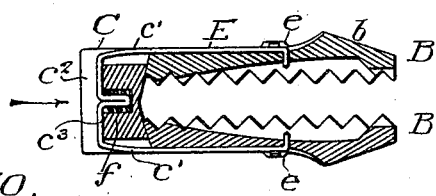
Witnesses:
Willa A. Burrowes
Walter F. Pullinger
Inventor
Thomas J. Fegley
by his Attorneys
Howson & Howson
THE NORRIS PETERS CO., WASHINGTON, D. C.

UNITED STATES PATENT OFFICE.

THOMAS J. FEGLEY, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

CHUCK.

No. 917,033.   Specification of Letters Patent.   Patented April 6, 1909.

Application filed January 9, 1908. Serial No. 409,943.

*To all whom it may concern:*

Be it known that I, THOMAS J. FEGLEY, a citizen of the United States, residing in Philadelphia, Pennsylvania, have invented certain Improvements in Chucks, of which the following is a specification.

The main object of my invention is to construct a simple and effective chuck for firmly holding drill bits and other tools or rods.

A further object of the invention is to so arrange the jaws that they will accommodate themselves to the contour of the bit or other tool.

These objects I attain in the following manner, reference being had to the accompanying drawings, in which:—

Figure 1, is a longitudinal sectional view of my improved chuck on the line 1—1, Fig. 2; Fig. 2, is a longitudinal sectional view on the line 2—2, Fig. 1; Fig. 3, is an end view looking in the direction of the arrow, Fig. 1; Fig. 4, is a transverse sectional view on the line 4—4 Fig. 2; Fig. 5, is a detached sectional view of the jaws; Fig. 6, is an end view of the jaws looking in the direction of the arrow, Fig. 5; Fig. 7, is a detached side view of one of the jaws; Fig. 8, is a sectional view through one of the jaws on the line 8—8, Fig. 7; Fig. 9, is a perspective view of the block; and Fig. 10, is a detached side view of the body portion.

A is the body portion of the chuck having a shank $a$ which can form part of or be coupled to a drill stock or applied to a drilling machine. This body portion is screw threaded preferably throughout its length, as illustrated in Fig. 10, and has a transverse slot $a'$ for the reception of the jaws B—B, Fig. 5. These jaws are attached to a block C by means of a U-shaped spring E. Each jaw is beveled at the outer end $b$ and beveled at the inner end $b'$; the bevels being in opposite directions and each jaw is serrated at each edge $b^2$ forming teeth. The teeth of one jaw, when the jaws are closed, will fit into the teeth of the opposite jaw, thus holding the jaws rigidly against any longitudinal movement. The jaws are recessed as shown in Fig. 8 so as to allow them to grasp a bit and hold it absolutely rigid. The block C has opposite bevels at $c$—$c$ to conform to the bevel $b'$ of the jaws B, and the jaws are forced against this beveled portion by the operating sleeve D which has a beveled portion $d$ bearing against the beveled portion $b$ of the jaws, as clearly shown in Fig. 2. This sleeve has an internal thread $d$, which is adapted to the thread of the body portion A.

The spring E which is attached to the two jaws at $e$—$e$ is U-shaped and passes around the block C and is adapted to slots $c'$ in each side of the block and to a slot $c^2$ in the rear of the block. It also rests in grooves in the back of each jaw B as shown in Fig. 1. The spring is bent as shown in Fig. 5 so as to enter a cavity $e^3$ in the block, and in this cavity is a coiled spring $f$ tending to force the spring E out and consequently forcing the beveled portion $b'$ of the jaws against the beveled portion $c$ of the block. The spring E being secured to the jaws at $e$—$e$, allows them freedom of motion so that they will accommodate themselves to any bit or spindle mounted in the chuck.

In operation the operating sleeve D is turned on the screw threaded body portion so as to allow it to move outward releasing the jaws which are spread apart by the spring, the bit or other tool or rod is placed in the chuck between jaws, as illustrated in Fig. 2, and the operating sleeve D is turned in the reverse direction causing the beveled portion $d$ to force the jaws to close upon the stock of the bit. At the same time the jaws are forced against the inclined portions of the blocks C, which also cause the inner portions of the jaws to travel toward the bit; the bit in this instance being of the same diameter throughout. The jaws will accommodate themselves to the bit and grasp it, one jaw being parallel to the other, thus holding the bit firmly in the chuck.

I claim:

1. The combination in a chuck, of a slotted body portion having a threaded periphery, an operating sleeve beveled at one end and having an internal screw thread adapted to the thread on the body portion, a block mounted in the slot and having opposite bevels at the forward end, two jaws beveled at each end and mounted between the beveled portion of the sleeve and the block, a U-shaped spring extending around the block and having its ends attached to the jaws, so that the jaws can be assembled with the block before being placed in the chuck casing.

2. The combination in a chuck, of a threaded and slotted body portion, a sleeve mounted thereon and having a threaded portion at one end and an internal beveled portion at the opposite end, a block adapted to the slot in the spindle having opposite bevels at the forward end, two jaws mounted in the chuck, said jaws being beveled at each end, a spring attached to the jaws and passing around the block, and a coiled spring acting upon the first mentioned spring and tending to force the jaws against the block.

3. The combination in a chuck, of a slotted body portion, an operating sleeve having an internal bevel at the outer end, a block mounted in the slot in the body portion, and having opposite bevels at the forward end, two jaws, beveled at each end, a bevel at one end resting against the bevels of the block and the opposite end resting against the bevel of the sleeve, a spring attached to each jaw and passing around the block, said block being slotted to receive the spring, the central portion of the spring being bent inward and resting in a cavity in the block, and a coiled spring mounted in the cavity tending to force the spring out and forcing the jaws against the block.

In testimony whereof, I have signed my name to this specification, in the presence of two subscribing witnesses.

THOMAS J. FEGLEY.

Witnesses:
WM. E. SHUPE,
WM. A. BARR.